(12) United States Patent
Hermann et al.

(10) Patent No.: US 6,699,032 B2
(45) Date of Patent: Mar. 2, 2004

(54) CATALYTIC COMBUSTION OF STORAGE TANK OFF-GASES

(75) Inventors: Ingo Hermann, Mainz (DE); Michael Standke, Wiesbaden (DE); Martin Stadie, Langen (DE); Nadine Knoeting, Wiesbaden (DE)

(73) Assignee: General Motors Corporation, Detroit, MI (US)

( * ) Notice: Subject to any disclaimer, the term of this patent is extended or adjusted under 35 U.S.C. 154(b) by 3 days.

(21) Appl. No.: 10/085,672

(22) Filed: Feb. 26, 2002

(65) Prior Publication Data

US 2003/0162141 A1 Aug. 28, 2003

(51) Int. Cl.$^7$ .................... F23D 14/12; F23Q 11/00
(52) U.S. Cl. ............... 431/202; 431/268; 431/328
(58) Field of Search ............... 431/202, 5, 268, 431/170, 7, 326, 328

(56) References Cited

U.S. PATENT DOCUMENTS

| | | | |
|---|---|---|---|
| 3,979,175 A | * 9/1976 | Kattan et al. ............ | 431/202 |
| 4,133,301 A | 1/1979 | Fujiwara ................ | 126/413 |
| 4,213,947 A | * 7/1980 | Fremont et al. .......... | 431/5 |
| 4,631,024 A | 12/1986 | Shibata et al. .......... | 431/268 |
| 5,484,000 A | * 1/1996 | Hasselmann ............. | 141/7 |
| 5,810,577 A | 9/1998 | Ledjeff ................ | 431/170 |
| 6,193,500 B1 | * 2/2001 | Bradt et al. ........... | 431/5 |
| 6,270,336 B1 | * 8/2001 | Terashima et al. ....... | 431/268 |
| 6,425,754 B1 | * 7/2002 | Lindskog ............... | 431/5 |

FOREIGN PATENT DOCUMENTS

| | | | | |
|---|---|---|---|---|
| JP | 4-198618 A | * | 7/1992 | ........ F23D/11/40 |
| JP | 5-157211 A | * | 6/1993 | ........ F23G/7/06 |

* cited by examiner

Primary Examiner—Josiah Cocks
(74) Attorney, Agent, or Firm—Cary W. Brooks

(57) ABSTRACT

Apparatus for storing a combustible gas including a pressure storage vessel, a pressure relief valve communicating with the storage vessel for venting the gas from the vessel when the pressure therein is too high, and a catalytic reactor communicating with the pressure relief valve to catalytically combust the gas exiting the valve and thereby reduce the amount of such gas that enters the environment.

1 Claim, 2 Drawing Sheets

CATALYTIC COMBUSTION OF STORAGE TANK OFF-GASES

TECHNICAL FIELD

This invention relates to the storage of combustible gases in pressure vessels, and more particularly to preventing buildup of excessive pressure in the vessel while preventing the emission of the combustible gases into the environment.

BACKGROUND OF THE INVENTION

It is known to store combustible gases such as hydrogen, methane etc. under pressure in suitable pressure vessels. In some instances, the gases are stored in the gas phase under moderately high pressures. In other instances, the gases may be stored in the liquid phase under higher pressures and lower temperatures.

Pressure vessels have a maximum allowable pressure tolerance, and the gas pressure within the vessel must be kept below that pressure to insure the integrity of the vessel. The pressure within the vessel varies with the amount of heat transferred into the vessel from the outside. While thermal insulation can be used to minimize such heat transfer, it is inevitable that some heat will be transferred into the vessel causing a pressure rise therein. For stationary applications, the vessels can be made with extra material (e.g. metal or fiber reinforced plastic) to accommodate the pressure rise, and to otherwise provide extra vessel strength without any great sacrifice. For mobile applications (e.g. fueling vehicles) however, the extra material undesirably consumes more space and adds more weight to the vehicle. Smaller, lighter-weight vessels can be employed for mobile applications if the pressure within the vessel can be managed so as to keep it below the maximum pressure tolerance of the lighter-weight vessels.

SUMMARY OF THE INVENTION

The present invention (1) manages the pressure of a combustible gas within a pressure vessel by venting the vessel to keep the pressure therein below the vessel's maximum pressure tolerance while, at the same time, (2) prevents undesirable combustible gas emissions from escaping to the environment. More specifically, the invention contemplates apparatus for storing a combustible gas that includes (i) a pressure vessel for containing the gas under pressure, which vessel has a maximum allowable pressure tolerance, (ii) a pressure relief valve communicating with the vessel for venting the gas before the vessel's pressure tolerance is reached, and (iii) a catalytic reactor communicating with the pressure relief valve for catalytically combusting combustible gas exiting the relief valve with air so as prevent emission of the combustible gas into the environment. The catalytic reactor preferably comprises at least one catalytic diffusion burner and a housing surrounding the burner wherein (a) the catalytic burner comprises a microporous body, a combustion catalyst on a surface of the body, and a first inlet for admitting the gas to the microporous body for diffusion through the microporous body and reaction with air on the catalyst, and (b) the housing has a second inlet for admitting air to the burner and an outlet for exhausting combustion gases to the environment. More preferably, the microporous body comprises a tube having a microporous wall, and the inlet supplies the combustible gas to the center of the tube for radial diffusion through the porous wall. The microporous tube surrounds a perforated gas distribution pipe that distributes the gas substantially uniformly along the length of the microporous tube. Most preferably, the apparatus includes a second catalytic burner downstream of the one catalytic burner for receiving exhaust gas from the one burner and catalytically combusting any uncombusted combustible gas that might be contained therein. According to a most preferred embodiment, the apparatus further includes an igniter downstream of the catalytic burner(s) to ignite any uncombusted combustible gas passing through said the burner(s) to heat-up the burner and light-off the catalyst at start-up, and otherwise ignite any residual combustible gas remaining in the combustion gases from the burner(s).

The invention will be better understood when considered in the light of the following detailed description of a preferred embodiment thereof which is given hereafter in connection with the attached drawings in which:

DESCRIPTION OF THE PREFERRED EMBODIMENT

Figure 1:
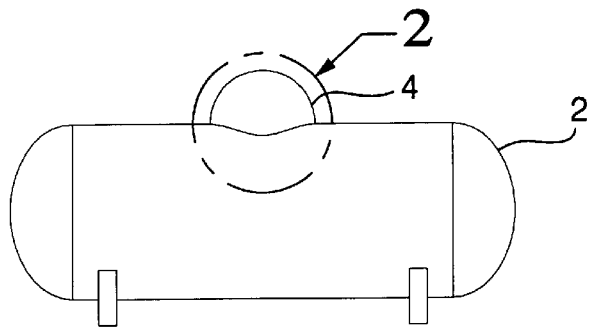
FIG. 1 is a side elevational view of a pressure vessel for storing combustible gases in either the gas or liquid phases.
Figure 2:
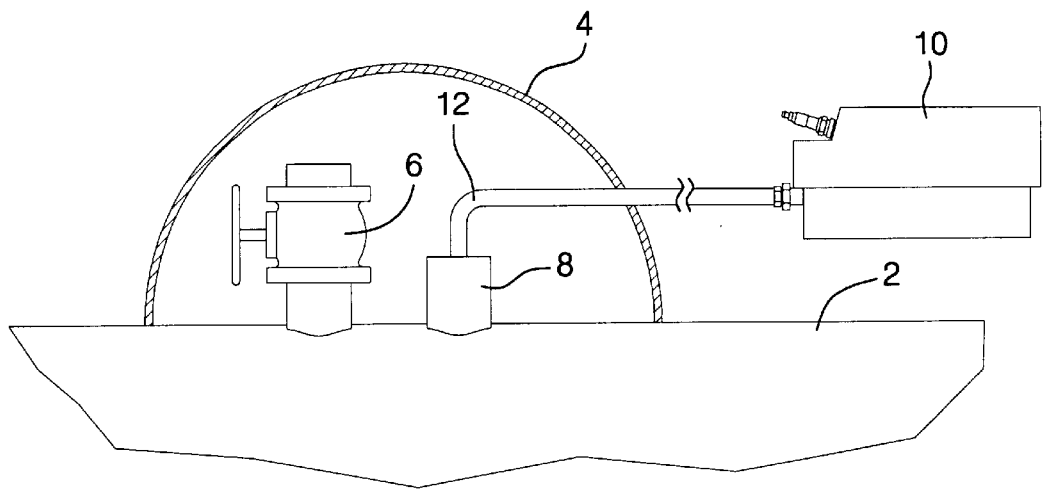
FIG. 2 is a partially sectioned, enlarged portion of FIG. 1.

FIGS. 1 and 2 show a pressure vessel 2 having a protective dome 4 covering (i) a fill valve 6 for filling the vessel with combustible gas/liquid, and (ii) a pressure relief valve 8 for venting the vessel 2 when the pressure therein exceeds the relief pressure setting of the valve 8. A catalytic reactor 10 is located remote from the vessel 2 for catalytically reacting any off-gasses exiting the vessel 2 via the relief valve 8. The pressure relief valve 8 may be any of a variety of conventional (e.g. spring biased) valves set to open at a pressure that is below the maximum pressure tolerance of the vessel 2. When the pressure in the vessel 2 exceeds the pressure setting of the relief valve 8, the valve 8 opens and vents gas from the vessel 2 to maintain the pressure therein at or below the set pressure of the valve 8. Rather then being vented directly to the environment, the gas vented through the valve 8 is directed to the catalytic reactor 10 by pipe 12 where it is reacted with air to form $H_2O$ (in the case of $H_2$), or $H_2O+CO_2$ in the case of methane and other combustible gaseous hydrocarbons.

Figure 3:
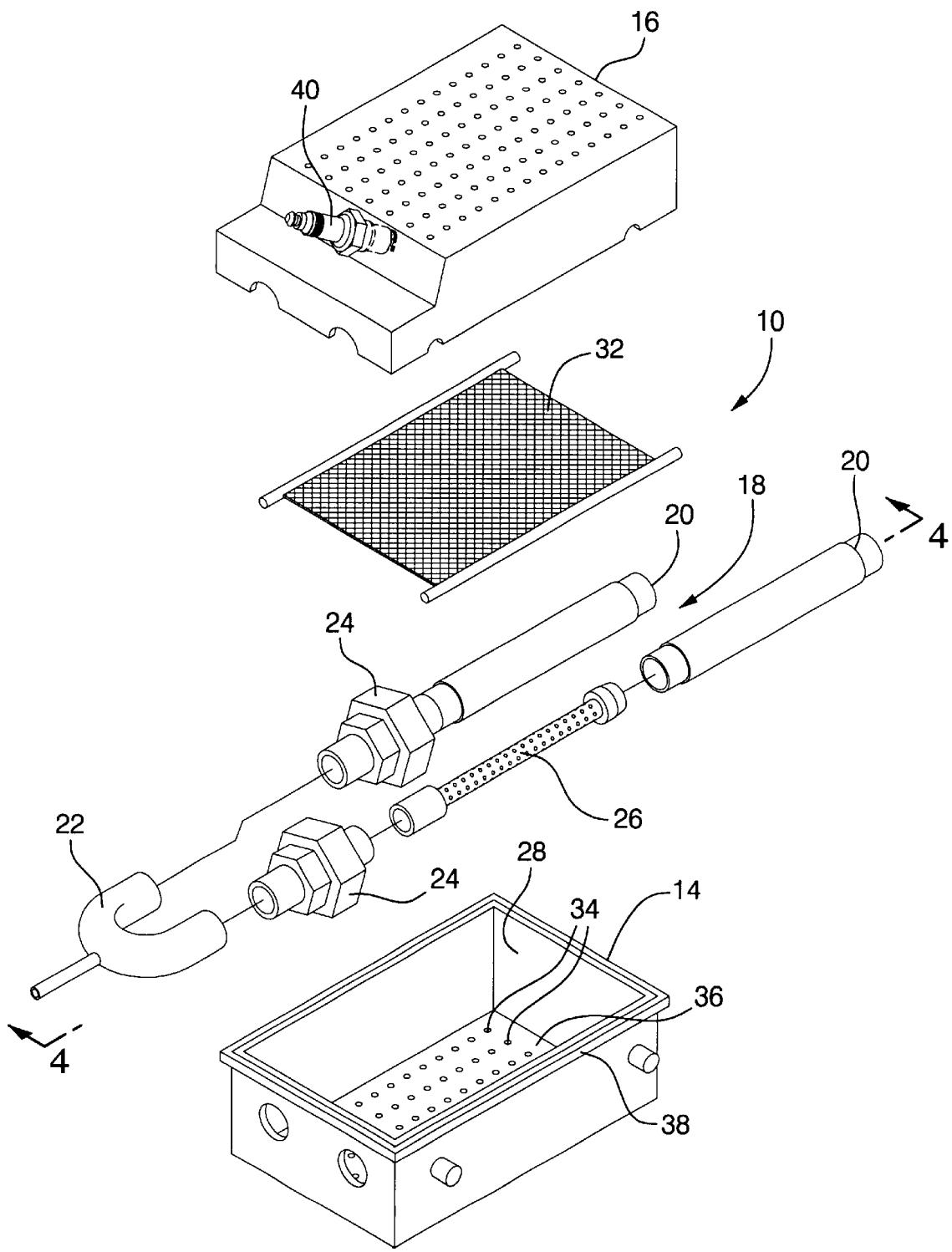
FIG. 3 is an exploded, isometric view of a preferred catalytic reactor according to the present invention.

FIG. 3 shows an exploded isometric view of a preferred embodiment of a catalytic reactor 10 in accordance with the present invention. FIG. 3 depicts a housing including a base portion 14 and cover portion 16 that joins together to house a catalytic burner 18. The catalytic burner 18 comprises one or more tubular burner elements 20 that receive the combustible gas from the relief valve 8 via a manifold 22, which is coupled to the burner elements 20 by unions 24. The gas enters the tubular burner elements 22 through a perforated gas-distribution pipe 26 that distributes the gas substantially equally along the length of the tubular burner elements 20. The burner elements 20 are housed in one (e.g. the lower) chamber 28 of the housing, and are separated from a second chamber 30 (see FIG. 4) in the cover portion 16 by means of a second burner in the form of catalyzed screen 32. The second burner 32 serves to receive gas exhausting from the tubular burner(s) and react any unreacted combustible gas therein with air to rid such exhaust gas of any residual combustible gas. Air is admitted to the housing via perforations 34 in the wall 36 of the base portion 14, and through porous packing 38 between the base 14 and cover 26 portions of the housing.

An igniter (e.g. spark plug) 40 projects into the chamber 30 to ignite any combustible gas that passes unreacted through the burners 20 and 32. The igniter 40 is particularly useful at the beginning of the catalytic combustion process when the burners are cold, i.e. below the light-off temperature of the catalyst(s). When the catalyst(s) is/are below their light-off temperature, the combustible gas passes through the burner(s) unreacted and is ignited by the igniter 40 and burned as a flame. The heat generated by such flame burning of the gases heats the burner(s) to the point where the light-off temperature of the catalyst(s) is/are reached and the catalytic combustion of the gases commences. The igniter may then be deenergized, or alternatively may continue to spark to ignite any residual combustible gases that evade catalytic combustion by the catalyzed burners.

Figure 4:
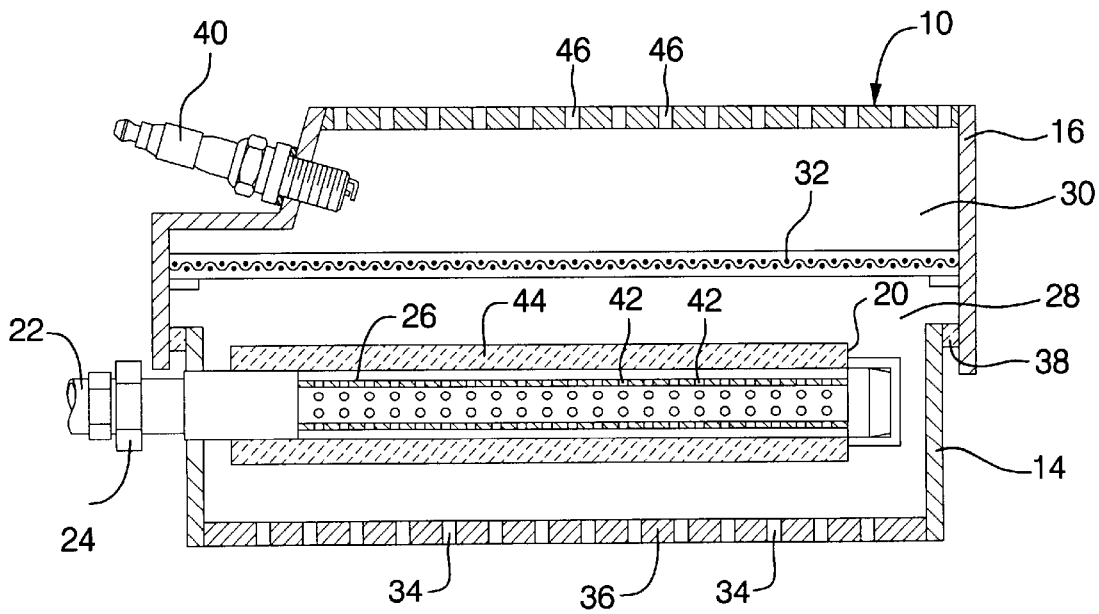
FIG. 4 is a side sectional view of the catalytic reactor of FIG. 3 taken in the direction 4—4 of FIG. 3.

FIG. 4 shows the catalytic reactor 10 with its housing cover portion 14 nesting within the housing base portion 16 and secured thereto by means of porous packing material 38 through which some air is admitted into the one chamber 28. It further shows that the wall 36 defining the one chamber 28 includes a plurality of perforations 34 through which air is admitted into the one chamber 28. The tubular burner(s) 20 comprise a gas distribution pipe 26 having a plurality of perforations 42 therein. The combustible gas enters the gas distribution pipe 26 and exits through the perforations 42 along the length of a porous tube 44 onto which a suitable catalyst is deposited. A suitable catalyst for combusting hydrogen or methane comprises a noble metal (e.g. Pt or Pd) with the light-off temperature for $H_2$ being near $-30°$ C., and the light-off temperature for methane being nearer $700°$ C. The microporous tube 44 itself may comprise a microporous (e.g. sintered) metal or ceramic material well known to those skilled in the art of catalyst support materials. A second burner comprises a fine-mesh catalyzed screen 32 that is well known to those skilled in the art and separates the one chamber 28 from the other chamber 30 and lies downstream from the tubular burner(s) 20 in the direction of flow of the gas. Sufficient air enters the one chamber 28 through the packing 38 and perforations 34 to support the catalytic combustion on both the porous tubular burner(s) 20 and the fine-screen burner 32. Perforations 46 in the housing cover portion 16 allow the combustion gases (i.e. principally $H_2O$ & $CO_2$) to escape into the environment.

While the invention has been described primarily in terms of a certain specific embodiment thereof it is not intended to be limited thereto, but rather only to the extent set forth hereafter in the claims which follow.

What is claimed is:

1. Apparatus for storing a combustible gas comprising a pressure vessel adapted to contain said gas under pressure, said vessel having a maximum allowable pressure tolerance, a pressure relief valve communicating with said vessel for venting said gas to the atmosphere at, or before, said pressure tolerance is reached, and a catalytic reactor communicating with said pressure relief valve for catalytically combusting gas exiling said relief valve before it is exhausted to the environment, wherein said catalytic reactor comprises (1) a first catalytic burner having a microporous body, (2) a combustion catalyst on a surface of said body, (3) a first inlet for admitting said gas to said microporous body for passing through said body and reaction with air on said catalyst, (4) a second catalytic burner downstream of said one catalytic burner fir receiving exhaust gas exiling from said first burner and catalytically combusting any uncombusted said combustible gas that might be contained in said exhaust gas, (5) an igniter downstream of said second catalytic burner to ignite any uncombusted said gas initially passing through said second burner to heat said burners and light-off said catalysts, and (6) a housing surrounding said catalytic burners, said housing having a second inlet for admitting air to said burners and an outlet for exhausting combustion gases to the environment.

* * * * *

UNITED STATES PATENT AND TRADEMARK OFFICE
CERTIFICATE OF CORRECTION

PATENT NO. : 6,699,032 B2
DATED : March 2, 2004
INVENTOR(S) : Hermann et al.

It is certified that error appears in the above-identified patent and that said Letters Patent is hereby corrected as shown below:

<u>Title page,</u>
Item [75], Inventors, "Nadine Knoeting" should read -- Nadine Knoetig --.

Signed and Sealed this

Twentieth Day of July, 2004

JON W. DUDAS
*Acting Director of the United States Patent and Trademark Office*